UNITED STATES PATENT OFFICE

CHARLES J. STROSACKER, CHESTER C. KENNEDY, AND EARL L. PELTON, OF MIDLAND, MICHIGAN, ASSIGNORS TO THE DOW CHEMICAL COMPANY, OF MIDLAND, MICHIGAN, A CORPORATION OF MICHIGAN

METHODS OF PREPARING BROM-ISATIN

No Drawing.   Application filed August 23, 1926.   Serial No. 131,114.

This invention relates more particularly to the preparation of bromisatin, and it is among the objects of the invention to provide improved methods of making bromisatin from indigo as starting material. Other objects and advantages will appear as the description proceeds.

To the accomplishment of the foregoing and related ends, the invention, then, consists in the features fully described hereinafter, and particularly pointed out in the claims, the following description setting forth but few of various ways in which the principle of the invention may be used.

If indigo paste, water and bromine be mixed together, considerable heat is evolved, and after a period depending on the temperature, quantity and concentration of bromine, and to some extent on the acidity, the blue color changes to green and gradually to yellow. When heat and more than a theoretical molecular proportional amount of bromine sufficient to transform the indigo to dibrom-isatin is used, all of the indigo can be oxidized and the precipitate is clear yellow. The yield of bromisatin is rather low however, and extensive decomposition occurs, giving such products as tribromaniline, etc.

If the reaction be carried out, however, with careful cooling, the yield of brominated isatin is better, but some indigo remains unoxidized and only partially brominated. The bromisatin formed has quite a uniform bromine content. Where less than the theoretical quantity of bromine required for the production of dibrom-isatin is used, and some indigo is left unchanged, the bromine content of the brominated isatin is only slightly lower than where an excess of bromine or higher temperature has oxidized all of the indigo. About 95 per cent. of the theoretical amount of bromine for making dibrom-isatin is found to give the best yield based on the indigo and the bromine. As an example, 150 parts by weight of a 20 per cent. indigo paste are well mixed with 475 parts by weight or more of fine ice, and after about five minutes, 104.7 parts by weight of bromine is stirred in. The mixture is allowed to stand with an occasional stirring for twenty-four hours. The greenish yellow precipitate is now worked up by filtering, extracting with warm dilute sodium hydroxide solution, acidulating just acid to Congo red indicator, and filtering. This filter cake is in turn extracted with warm dilute sodium hydroxide solution. On acidulating just acid to Congo red, the solution is further filtered, and the filtrate contains the bromisatin, which can be precipitated out as a light yellow precipitate by acidifying with hydrochloric acid. Yields of 85–88 per cent. of bromisatin based on the indigo used may be thus obtained, in accordance with the equation:

(1) 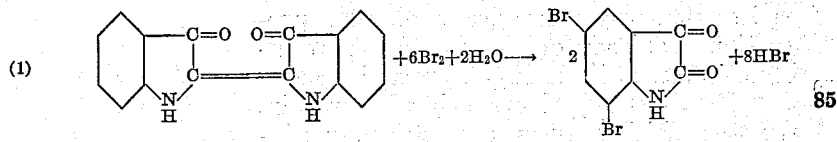

As an improvement on this, a quantity of a bromate, for instance in the form of sodium bromate, may be provided in the reaction mixture, preferably in slightly larger proportion than theoretical quantity, that is, slightly more than what would be represented in such equation as:

(2) 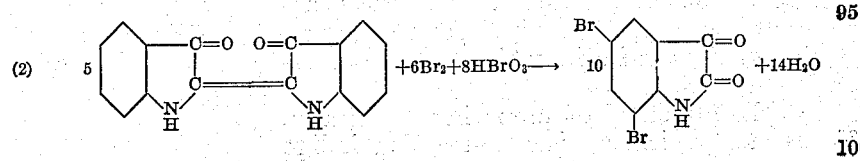

As as example, 150 parts by weight of a 20 per cent. indigo paste and 28.3 parts by weight of $NaBrO_3$ are well mixed with about 500 parts of weight of ice, until the bromate is all dissolved. Then 25 parts of 56.5 per cent $H_2SO_4$ cooled with ice are mixed in, and finally 19.75 parts by weight of bromine. The separation of the bromisatin may be thence carried out as in the prior example. Yields as high and higher than in the prior instance may be obtained, and with the advantages that there is very little by-product HBr and almost no indigo left to be recovered or wasted. A further advantage resulting from the use of a bromate in the foregoing reaction is that all of the bromine as such or as bromate entering into the reaction appears in the brominated isatin product; none thereof being converted to hydrobromic acid, thus securing substantially a complete utilization of bromine in the principal product without the formation of bromine-containing by-products. In other words, a saving of bromine is effected in that only so much thereof is consumed in the reaction as is recovered in the brominated isatin product, no additional amount being required for the formation of hydrobromic acid as in Equation (1).

Other modes of applying the principle of the invention may be employed, change being made as regards the features described, provided the steps stated by any of the following claims or the equivalent of such be used.

We therefore particularly point out and distinctly claim as our invention:—

1. In a method of preparing bromisatin, the step which consists in reacting upon indigo in the presence of water with bromine in less than the theoretical molecular proportion required for the formation of dibrom-isatin.

2. In a method of preparing bromisatin, the step which consists in reacting upon indigo in the presence of water with bromine in less than the theoretical molecular proportion required for the formation of dibrom-isatin, while cooling the reaction mass.

3. In a method of preparing bromisatin, the step which consists in reacting upon indigo in the presence of water with bromine in about 95 per cent. of the theoretical molecular proportion required for the formation of dibrom-isatin.

4. In a method of preparing bromisatin, the step which consists in reacting upon indigo in the presence of water with bromine in about 95 per cent. of the theoretical molecular proportion required for the formation of dibrom-isatin, while cooling the reaction mass.

5. In a method of preparing bromisatin, the step which consists in reacting indigo with bromine in the presence of an aqueous solution containing bromic acid.

6. In a method of preparing bromisatin, the step which consists in reacting indigo with bromine in the presence of an aqueous solution containing bromic acid in the proportion of approximately $6Br_2$ to $8HBrO_3$.

7. In a method of preparing bromisatin, the steps which consist in mixing indigo with an aqueous solution of a bromate, acidifying with a mineral acid capable of converting such bromate to bromic acid, and then adding bromine in proportion of approximately $6Br_2$ to $8HBrO_3$ while cooling the reaction mixture.

8. In a method of preparing bromisatin, the steps which consist in mixing indigo with an aqueous solution of a bromate, acidifying with sulphuric acid to convert such bromate to bromic acid, and then adding bromine in proportion of approximately $6Br_2$ to $8HBrO_3$ while cooling the reaction mixture.

Signed by us this 20th day of August, 1926.

CHARLES J. STROSACKER.
CHESTER C. KENNEDY.
EARL L. PELTON.